US008259633B2

(12) United States Patent
Iino et al.

(10) Patent No.: US 8,259,633 B2
(45) Date of Patent: Sep. 4, 2012

(54) WIRELESS LAN COMMUNICATION DEVICE AND BEACON TRANSMITTING METHOD

(75) Inventors: Satoshi Iino, Kanagawa (JP); Mikihito Sugiura, Kanagawa (JP); Kazumasa Gomyo, Kanagawa (JP)

(73) Assignee: Panasonic Corporation, Osaka (JP)

( * ) Notice: Subject to any disclaimer, the term of this patent is extended or adjusted under 35 U.S.C. 154(b) by 548 days.

(21) Appl. No.: 12/445,921

(22) PCT Filed: Oct. 30, 2006

(86) PCT No.: PCT/JP2006/321671
§ 371 (c)(1),
(2), (4) Date: Jul. 30, 2009

(87) PCT Pub. No.: WO2008/053519
PCT Pub. Date: May 8, 2008

(65) Prior Publication Data
US 2010/0296495 A1    Nov. 25, 2010

(51) Int. Cl.
*G08C 17/00* (2006.01)
*H04W 36/00* (2009.01)
(52) U.S. Cl. ........ 370/311; 370/310; 370/328; 370/338; 455/334; 455/343.1; 455/343.2
(58) Field of Classification Search .............. 370/310, 370/328, 338, 311; 455/334, 343.1, 343.2
See application file for complete search history.

(56) References Cited

U.S. PATENT DOCUMENTS

| | | | |
|---|---|---|---|
| 2004/0053621 A1* | 3/2004 | Sugaya | 455/450 |
| 2005/0036475 A1* | 2/2005 | Nishiyama et al. | 370/347 |
| 2007/0050523 A1* | 3/2007 | Emeott et al. | 709/248 |
| 2007/0195727 A1* | 8/2007 | Kinder et al. | 370/328 |
| 2007/0258397 A1* | 11/2007 | Ho et al. | 370/328 |

FOREIGN PATENT DOCUMENTS

| | | |
|---|---|---|
| JP | 2004040645 A | 2/2004 |
| JP | 2004128949 A | 4/2004 |

OTHER PUBLICATIONS

ANSI/IEEE "ANSI/IEEE Standard 802.11 Part 11: Wireless LAN Medium Access Control (MAC) and Physical Layer (PHY) Specifications" 1999, p. 57.*

"Part 11: Wireless LAN Medium Access Control (MAC) and Physical Layer (PHY) Specifications: High-Speed Physical Layer in the 5 GHz Band," Corrections to Supplement to IEEE Standard for Information Technology, LAN/MAN Standards Committee of the IEEE Computer Society, IEEE Std 802.11a-1999, issued Aug. 10, 2000.

* cited by examiner

*Primary Examiner* — Dang Ton
*Assistant Examiner* — Robert M Morlan
(74) *Attorney, Agent, or Firm* — Seed IP Law Group PLLC

(57) ABSTRACT

A wireless LAN communication device is provided for making it possible to set beacons including DTIM information elements not to be synchronous in the case that the timing for generating the beacons including DTIM information elements is the same among access points, so that it is avoidable that only a terminal device under a specific access point among access points using the same channel is subjected to a delay and jitters, while anxiety about mutual interference of the terminal devices is removed in the case of broadcast and multicast service, so that a fair broadcast and multicast service can be received. In the device, a wireless LAN control unit (202) detects beacons of other stations received in a prescribed period of time before the transmission of its own station (200). A beacon analyzing unit (203) analyzes the beacons of the other stations and adjusts transmission intervals of its own DTIM beacon.

9 Claims, 14 Drawing Sheets

… … …

WIRELESS LAN COMMUNICATION DEVICE AND BEACON TRANSMITTING METHOD

TECHNICAL FIELD

The present invention particularly relates to a wireless LAN communication apparatus and a beacon transmission method for providing a broadcast/multicast service, through a plurality of access points, to terminals under the control of the respective access points.

BACKGROUND ART

As terminals mounted with a wireless LAN interface are becoming widespread, it is becoming important to perform power saving control for terminals operating on a battery as a power supply and the wireless LAN standard provides a power management function to suppress the battery consumption of the terminals (e.g., Non-Patent Document 1). Furthermore, the wireless LAN standard provides radio access control methods such as DCF (Distributed Coordination Function), whereby each access point performs access control in an autonomous and distributed manner, and PCF (Point Coordination Function), whereby a specific station performs access control through polling in a concentrated manner.

The beacon period and DTIM (Delivery Traffic Indication Message) period are provided as general settable parameters of access points. Here, the "beacon period" refers to the period in which a beacon is transmitted. Furthermore, the "DTIM period" refers to the period in which a beacon including information indicating that packet data that has been waiting to be transmitted is transmitted (hereinafter "DTIM beacon"), that is, the period in which a DTIM beacon including information indicating that traffic stored at an access point is transmitted, and is expressed in beacon period units. Furthermore, data transmitted after a DTIM beacon includes a broadcast message or multicast message. When, for example, when the DTIM period is "3," this means that a DTIM beacon is transmitted once every three beacons. Whether or not a beacon transmitted is a DTIM beacon is determined by whether or not the DTIM count value in a TIM information element, which is an information element included in the beacon transmitted, is "0."

The beacon period and DTIM period can be changed during operations, but these periods are generally operated at their default values. Furthermore, in areas where wireless LAN is currently widespread, neighboring access points may communicate with each other using the same channel. When neighboring access points carry out transmission using the same channel, interference is avoided by controlling transmission of frames using a collision avoidance mechanism in wireless LAN communication called "CSMA/CA."

Next, power saving control using DCF will be explained using FIG. 1. FIG. 1 shows an overview of power saving control in an infrastructure mode. In FIG. 1, an access point transmits beacon 10 or DTIM beacon 11 at preset beacon period H1 to inform terminal A and terminal B of the presence of the access point. Beacon 10 and DTIM beacon 11 include a TIM element indicating that frames directed to terminal A and terminal B under the control are accumulated, so that each terminal can recognize that there are frames directed to the terminal, by referring to the TIM information element upon receiving beacon 10 and DTIM beacon 11. Terminal A and terminal B can set two types of states, the "awake" state in which power is supplied to a radio transmitting/receiving section and the "doze" state in which only minimum necessary power is supplied, and can determine the timing to set to the awake state using "Listen Interval" and "Receive DTIMs". "Listen Interval" defines the period in which terminal A and terminal B receive a beacon, that is, beacon period H1, and "Receive DTIM" indicates whether or not to receive DTIM beacon 11. Since terminal A and terminal B in a power saving mode that receive a broadcast/multicast service must necessarily receive DTIM beacon 11, terminal A and terminal B transition to awake state 15 at DTIM period H2. Furthermore, the access point transmits stored broadcast/multicast frame 12 to terminals under the control immediately after transmitting DTIM beacon 11. By changing the setting to the awake state or the doze state in this way, each terminal can reduce power consumption compared to a case where power is always kept ON. Upon receiving PS-poll 13 transmitted from terminal A and terminal B, the access point transmits unicast data 14 to terminal A or terminal B that transmitted PS-poll 13.

Furthermore, a delay occurs when power consumption is reduced through the power management function of radio terminals as described above, and therefore prior arts are known which attempt to solve the problem of delay by adjusting the DTIM period for applications requiring real-time performance (e.g., Patent Document 1).

Non-Patent Document 1: IEEE Documents Part 11: Wireless LAN Medium Access Control (MAC) and Physical Layer (PHY) Specifications Patent Document 1: Japanese Patent Application Laid-Open No. 2004-128949

DISCLOSURE OF INVENTION

Problems to be Solved by the Invention

However, in a conventional apparatus in a power saving mode defined in the IEEE802.11 standard, when a plurality of neighboring radio access points using the same radio channel use the same beacon period and DTIM period, the access points may transmit broadcast/multicast frames at the same timing. In this case, depending on the beacon transmission timing, there can be a situation in which interference between broadcast/multicast frames is likely to occur and the throughputs and service delays of terminals receiving the service under the control of the respective access points may deteriorate. Furthermore, depending on also services between access points, there can be differences in delay or bands available, resulting in problems that the service may be delivered unfairly and the service quality of the broadcast/multicast service may deteriorate.

FIG. 2 shows a situation in which interference between broadcast/multicast frames occurs. In FIG. 2, access point A is communicating with terminal A and access point B is communicating with terminal B. When beacon period H3 of access point A is substantially the same as beacon period H4 of access point B and timing at which access point A transmits beacon 20 is slightly earlier than timing at which access point B transmits beacon 21, access point B slightly delays timing of transmitting a beacon with respect to the transmission frame of access point A according to a communication collision avoidance mechanism in the wireless LAN.

For example, DTIM beacon 23 transmitted by access point B should originally be transmitted at the timing of DTIM beacon 26, but the timing is delayed to timing after access point A transmits broadcast/multicast frame 25. Likewise, broadcast/multicast frame 24 transmitted by access point B should originally be transmitted at timing of broadcast/multicast frame 27, but the timing is delayed to timing after access point A transmits broadcast/multicast frame 25 and after access point B transmits DTIM beacon 23 to be transmitted.

As a result, when the timing access point A transmits DTIM beacon 22 is the same as the timing access point B transmits DTIM beacon 23, there is a problem that transmission of broadcast/multicast frame 24 by access point B is always after transmission of broadcast/multicast frame 25 by access point A and broadcast/multicast frame 24 received by terminal B has a greater delay and jitter than broadcast/multicast frame received by terminal A, and the band used also deteriorates. This problem becomes particularly obvious when access point A and access point B simultaneously transmit their services using the same broadcast/multicast frame to terminals.

Furthermore, Patent Document 1 describes a technique adopting an optimum DTIM period to terminals for each application and thereby improving delay and enabling real-time performance and power saving control together. However, Patent Document 1 does not assume the presence of a plurality of access points, takes no account of interference between the access points, and therefore when terminals under the control of a plurality of access points use the same application, the same DTIM period is set for these access points. As a result, DTIM beacons are synchronized with each other among a plurality of access points, which results in a problem that only terminals under the control of a certain specific access point have an increased delay and jitter and mutual interference may occur at the time of a broadcast/multicast service between access points.

It is therefore an object of the present invention to provide a wireless LAN communication apparatus and a beacon transmission method that prevent, when the timing to transmit DTIM beacons is substantially the same between access points, the DTIM beacons from synchronizing with each other, and can thereby prevent, even between access points using the same channel, only terminals under the control of a certain specific access point from having an increased delay and jitter, eliminate the possibility of mutual interference during a broadcast/multicast service and allow the terminals to receive a fair broadcast/multicast service.

Means for Solving the Problem

The wireless LAN communication apparatus of the present invention adopts a configuration including: a receiving section that receives a beacon, the beacon including first transmission period information comprising information about a beacon transmission period at another communication apparatus and second transmission period information comprising information about a transmission period of a delivery traffic indication message beacon at the another communication apparatus, the delivery traffic indication message beacon including information indicating that packet data that has been waiting to be transmitted is transmitted; a beacon detection section that detects the beacon received in the receiving section in a predetermined time immediately before or after a beacon of the wireless local area network communication apparatus is transmitted; a beacon correction section that corrects a transmission period of the delivery traffic indication message beacon at the wireless local area network communication apparatus based on the first transmission period information and the second transmission period information included in the detected beacon; and a transmitting section that transmits the delivery traffic indication message beacon at the corrected transmission period and transmits the packet data immediately after having transmitted the delivery traffic indication message beacon.

Furthermore, the wireless LAN communication apparatus of the present invention adopts a configuration including: a receiving section that receives a delivery traffic indication message beacon, the beacon including information indicating that packet data that has been waiting to be transmitted is transmitted; a beacon detection section that detects the beacon received in the receiving section in a predetermined time immediately before or after the beacon of the wireless local area network communication apparatus is transmitted; a beacon correction section that corrects the transmission period of the delivery traffic indication message beacon at the wireless local area network communication apparatus when the detection section detects reception of the beacon; and a transmitting section that transmits the delivery traffic indication message beacon at the corrected transmission period and transmits the packet data immediately after having transmitted the delivery traffic indication message beacon.

The beacon transmission method of the present invention includes: receiving a beacon including first transmission period information comprising information about a beacon transmission period at another communication apparatus and second transmission period information comprising information about a transmission period of a delivery traffic indication message beacon at the another communication apparatus, the delivery traffic indication message beacon including information indicating that packet data that has been waiting to be transmitted is transmitted; detecting a beacon received in a predetermined time immediately before or after the beacon of the wireless local area network communication apparatus is transmitted; correcting a transmission period of the delivery traffic indication message beacon at the wireless local area network communication apparatus based on the first transmission period information and the second transmission period information included in the detected beacon; and transmitting the delivery traffic indication message beacon at the corrected transmission period.

Furthermore, the beacon transmission method of the present invention includes: receiving a delivery traffic indication message beacon including information indicating that packet data that has been waiting to be transmitted is transmitted; detecting a beacon received in a predetermined time immediately before or after the beacon of the wireless local area network communication apparatus is transmitted; correcting the transmission period of the delivery traffic indication message beacon at the wireless local area network communication apparatus when the reception of the beacon is detected; and transmitting the delivery traffic indication message beacon at the corrected transmission period.

Advantageous Effect of the Invention

When the timing to transmit the DTIM beacon is substantially the same between access points, the present invention prevents DTIM beacons from synchronizing with each other, so that, even between access points using the same channel, it is possible to prevent the delay and jitter of only the terminals under the control of a certain specific access point from increasing, eliminate the possibility of interfering with each other during a broadcast/multicast service and receive a broadcast/multicast service fairly.

BEST MODE FOR CARRYING OUT THE INVENTION

Embodiments of the present invention will be explained below in detail with reference to the accompanying drawings.

Embodiment 1

Figure 1:
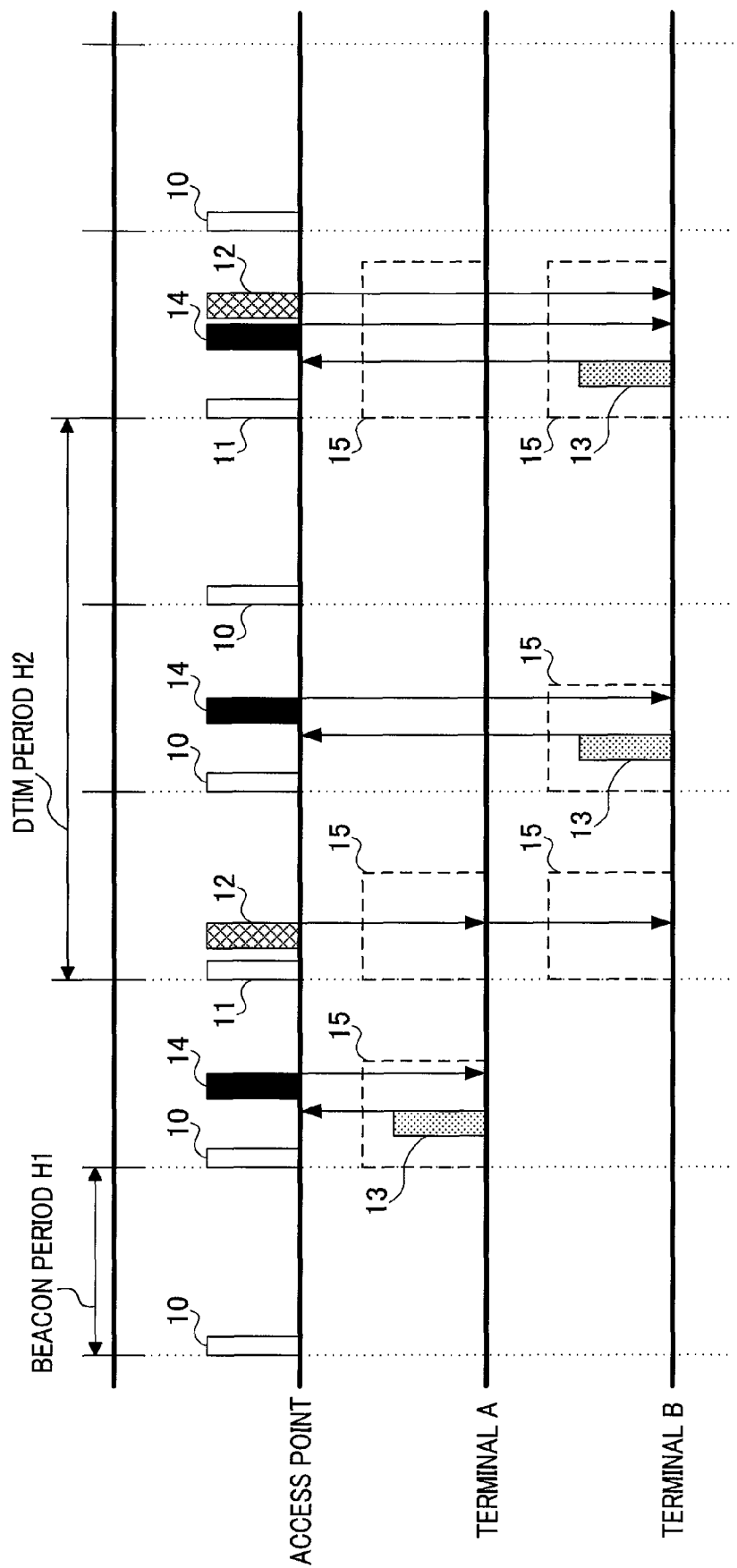
FIG. 1 shows an overview of power saving control in a conventional infrastructure mode.
Figure 2:
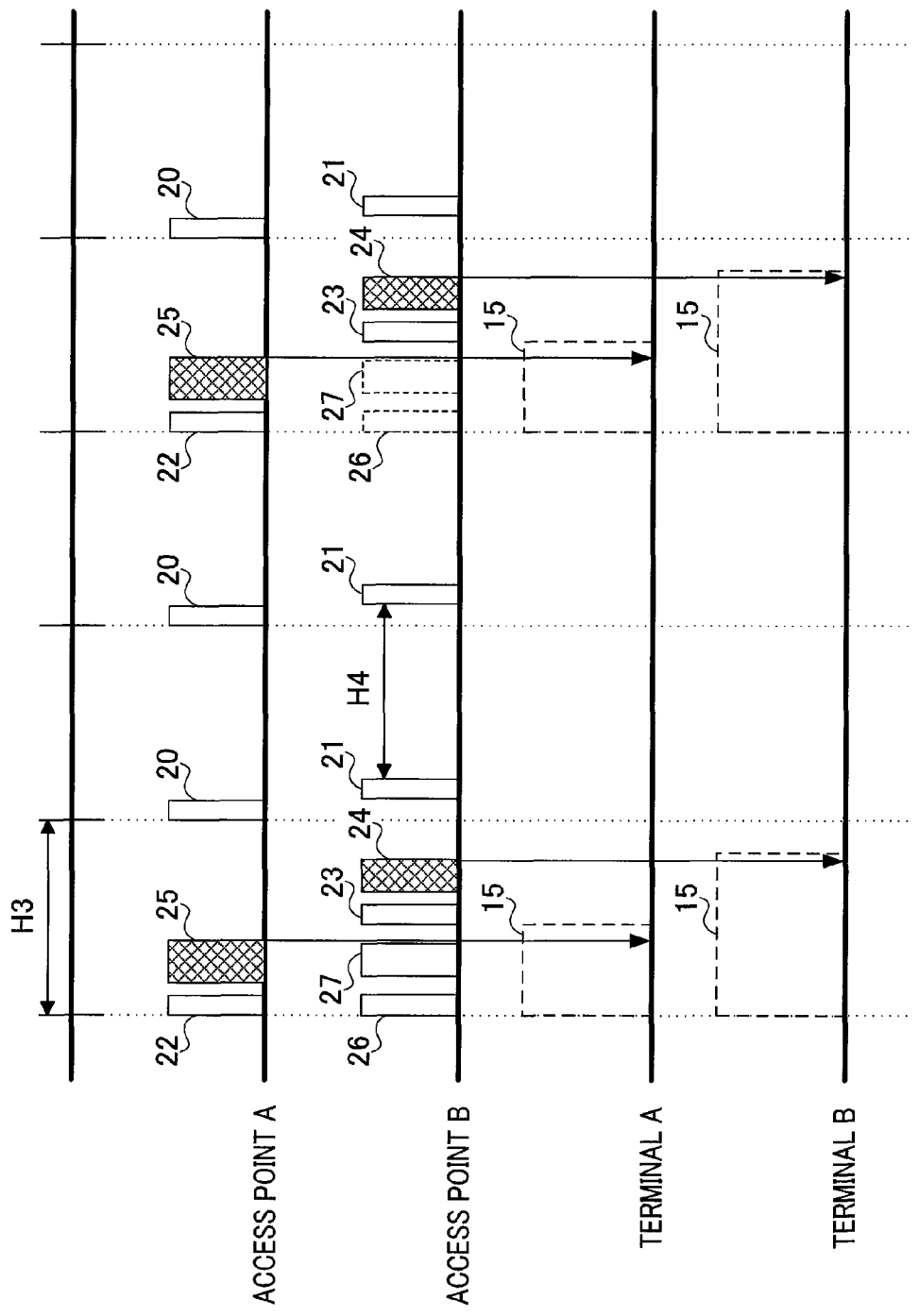
FIG. 2 shows a situation in which interference occurs between conventional broadcast/multicast frames.
Figure 3:
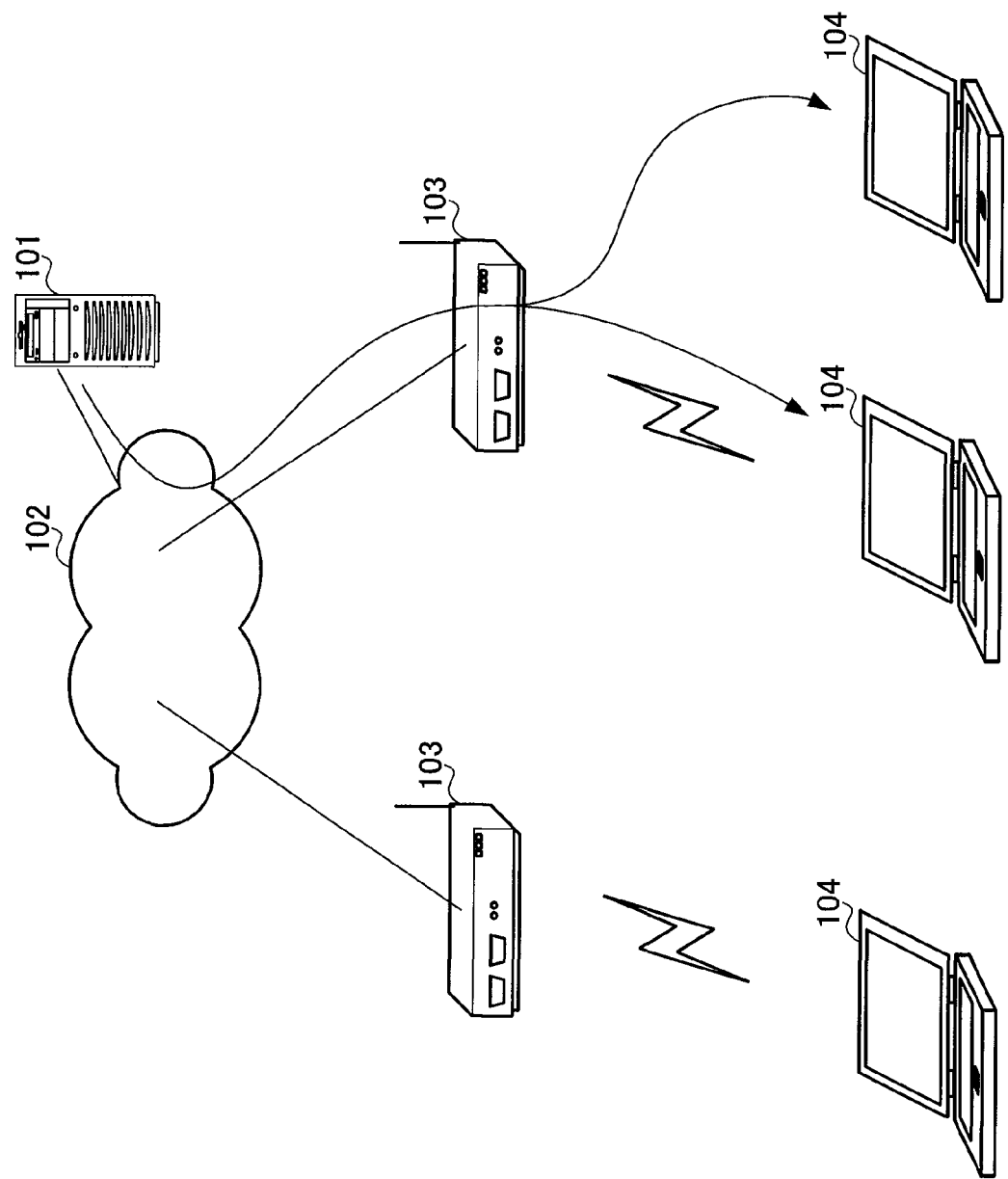
FIG. 3 illustrates an overview of a broadcast/multicast service according to Embodiment 1 of the present invention.

FIG. 3 illustrates an overview of a broadcast/multicast service according to Embodiment 1 of the present invention. As shown in FIG. 3, broadcast/multicast service delivery data stored in content server 101 is delivered to terminal apparatuses 104 under the control of respective access points 103 via Internet 102 and the plurality of access points 103.

Figure 4:
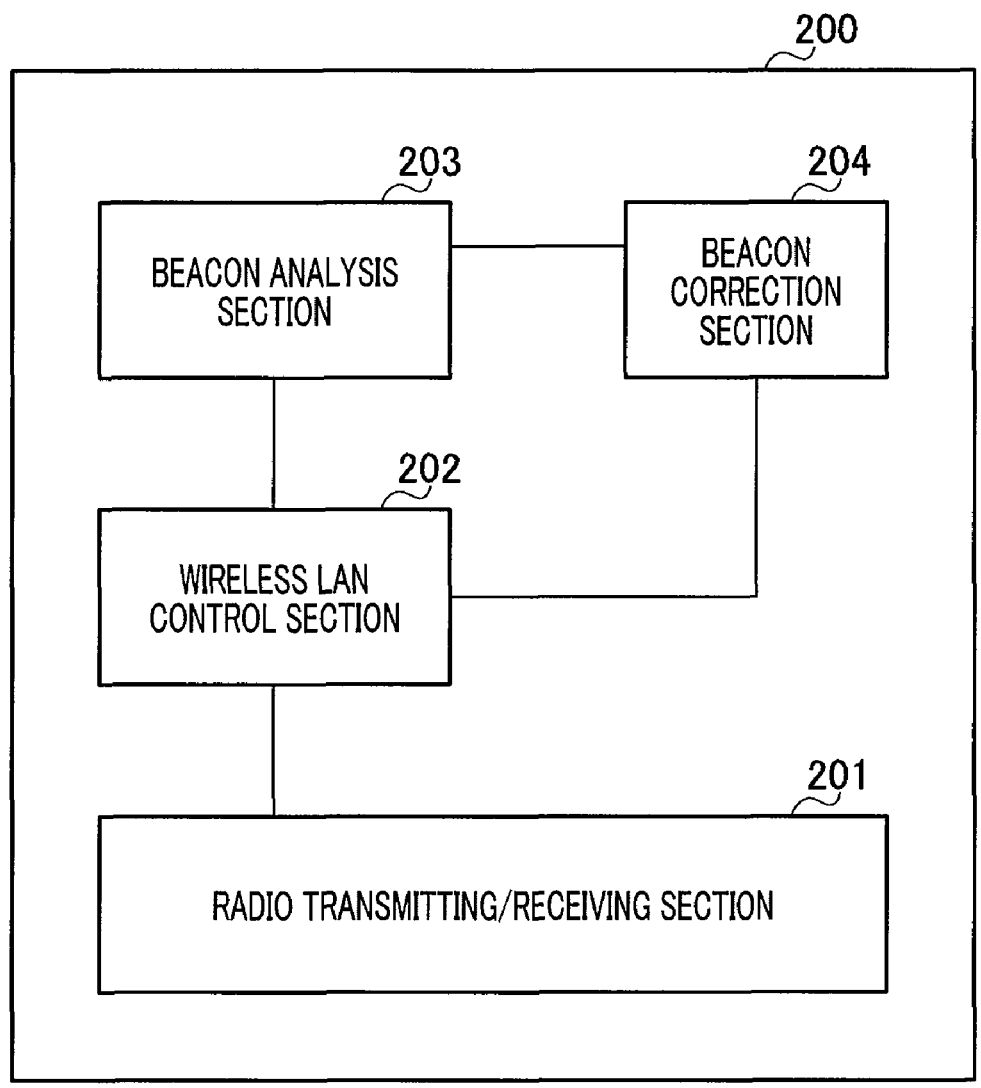
FIG. 4 is a block diagram showing a configuration of a wireless LAN communication apparatus according to Embodiment 1 of the present invention.

FIG. 4 is a block diagram showing a configuration of wireless LAN communication apparatus 200 according to Embodiment 1 of the present invention. Wireless LAN communication apparatus 200 is, for example, access point 103 in a wireless LAN.

Radio transmitting/receiving section 201 receives a beacon transmitted from another access point, down-converts the received beacon and outputs the beacon to wireless LAN control section 202. Furthermore, radio transmitting/receiving section 201 up-converts a beacon received as input from wireless LAN control section 202 and transmits the beacon.

Wireless LAN control section 202, which is a beacon detection section, performs control over a MAC layer such as CSMA/CA and access control, detects a beacon received as input from radio transmitting/receiving section 201, which radio transmitting/receiving section 201 has received within a predetermined time, and outputs the detection result to beacon analysis section 203. Furthermore, wireless LAN control section 202 outputs such a DTIM beacon that is transmitted at a DTIM period commanded by beacon correction section 204 to radio transmitting/receiving section 201.

Beacon analysis section 203, which is a beacon correction means, analyzes a beacon transmitted from another station using the detection result received as input from wireless LAN control section 202. That is, beacon analysis section 203 commands beacon correction section 204 to correct the DTIM period for wireless LAN communication apparatus 200, based on beacon period information (i.e. first transmission period information), which is information about the beacon period, and DTIM period information (i.e. second transmission period information), which is information about the DTIM period, included in the beacon detected by wireless LAN control section 202. To be more specific, when the beacon period of another station in the beacon period information matches with the beacon period of wireless LAN communication apparatus 200 and the DTIM period of another station in the DTIM period information matches with the DTIM period of wireless LAN communication apparatus 200, beacon analysis section 203 commands to correct the DTIM period of wireless LAN communication apparatus 200, such that the DTIM period of another station does not match with the DTIM period of wireless LAN communication apparatus 200.

Beacon correction section 204, which is a beacon correction means, commands wireless LAN control section 202 to transmit DTIM beacons at the DTIM period after the correction commanded from beacon analysis section 203. Details of the method of correcting a DTIM period will be described later.

Figure 5:
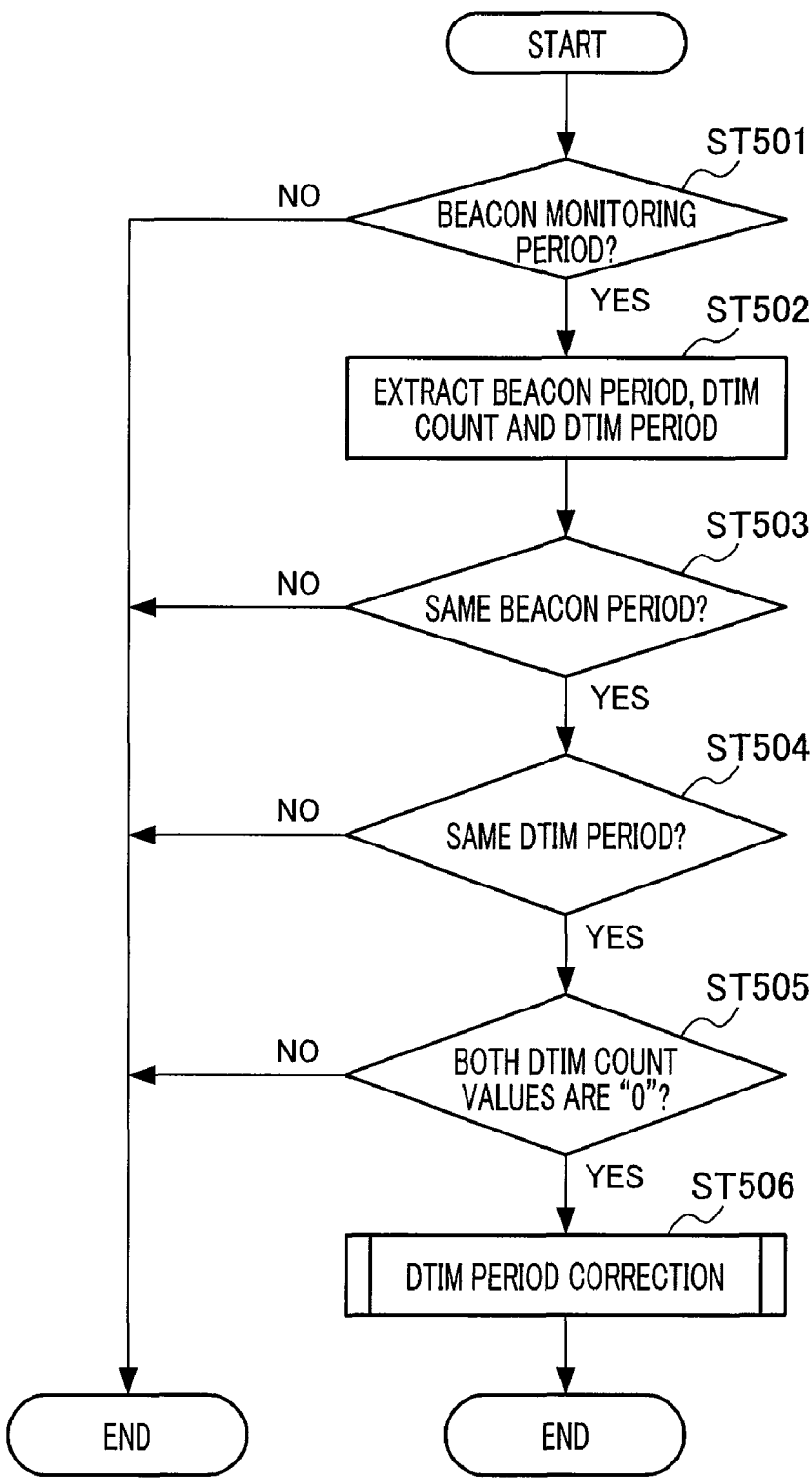
FIG. 5 is a flowchart showing operations of the wireless LAN communication apparatus according to Embodiment 1 of the present invention.

Next, operations of wireless LAN communication apparatus 200 will be explained using FIG. 5. FIG. 5 is a flowchart showing operations of wireless LAN communication apparatus 200. In FIG. 5, suppose wireless LAN communication apparatus 200 is the local station and is access point A, and wireless LAN communication apparatus 200 is another station and is access point B.

First, wireless LAN control section 202 of access point A checks whether or not a beacon has been received during a beacon monitoring period (step ST501). Here, the "beacon monitoring period" refers to the period immediately before or after access point A transmits a beacon.

Figure 6:
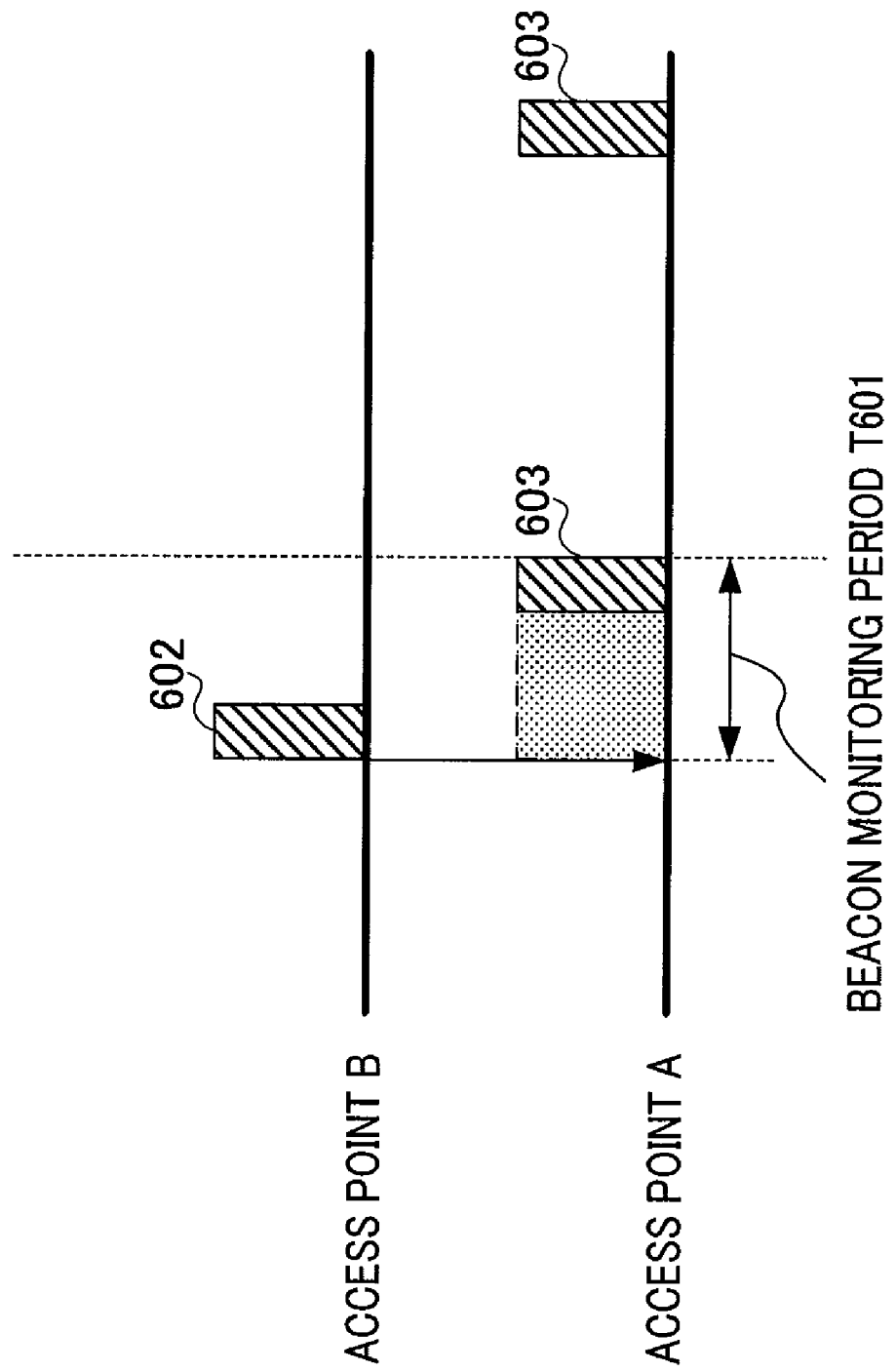
FIG. 6 shows beacon reception timing according to Embodiment 1 of the present invention.

FIG. 6 shows an example where beacon monitoring period T601 of access point A is provided immediately before beacon transmission by access point A. That is, the fact that beacon 602 received by access point A is within beacon monitoring period T601 means that there is a possibility that the transmission timing of beacon 603 of access point A may overlap the transmission timing of beacon 602 of access point B. The length of beacon monitoring period T601 may be arbitrarily set.

Referring back to FIG. 5, when the beacon is not within beacon monitoring period T601 in step ST501, wireless LAN control section 202 terminates the processing or moves to step ST502 when the beacon is within beacon monitoring period T601.

Next, beacon analysis section 203 of access point A extracts information about a beacon period (Beacon Period), DTIM count (DTIM Count) value and DTIM period (DTIM Period), from the acquired beacon (step ST502).

Figure 7:
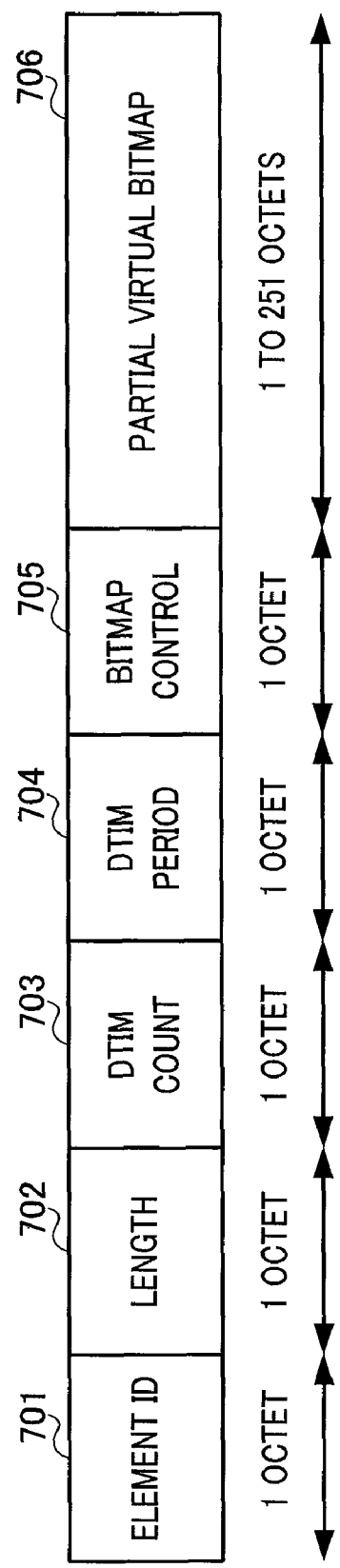
FIG. 7 shows a data format of a TIM information element according to Embodiment 1 of the present invention.

FIG. 7 shows a data format of TIM information elements included in a beacon. As shown in FIG. 7, the TIM information element includes ID (Element ID) 701, data length (Length) 702, DTIM count value (DTIM Count) 703, DTIM period (DTIM Period) 704, bitmap control (Bitmap Control) 705 and partial virtual bitmap (Partial Virtual Bitmap) 706. Beacon analysis section 203 extracts DTIM count value 703 and DTIM period 704 from the TIM information element. For example, when the DTIM period is set to "3," a DTIM beacon is transmitted every third transmission. The DTIM count value indicates the number of beacons that need to be transmitted by the time the DTIM beacon is transmitted. For example, when wireless LAN communication apparatus 200 transmits a DTIM beacon, the DTIM count value always becomes "0." Here, DTIM count value "0" in the TIM information element included in the DTIM beacon is the information indicating that packet data that has been waiting to be transmitted is transmitted.

Referring back to FIG. 5 again, beacon analysis section 203 of access point A then compares the parameters of the acquired beacon of access point B with the parameters to be included in the beacon transmitted by access point A at the next timing. That is, beacon analysis section 203 compares the beacon period and DTIM period included in the beacons of both access point A and access point B (step ST503). Beacon analysis section 203 terminates the processing when the comparison result shows that the beacon periods are not the same, or moves to step ST504 when the beacon periods are the same.

Next, beacon analysis section 203 compares the DTIM periods (step ST504), and moves to step ST505 when the DTIM periods are the same, or terminates the processing when the DTIM periods are not the same.

Next, beacon analysis section 203 of access point A decides whether or not both the acquired DTIM count value of access point B and the next DTIM count value to be transmitted by access point A are "0" (step ST505). When both DTIM count values are "0," beacon analysis section 203 moves to step ST506 or terminates the processing when both DTIM count values are not "0."

Next, beacon correction section 204 of access point A corrects the DTIM period (step ST506), and access point A transmits a beacon so as to correspond to the corrected DTIM period.

Figure 8:
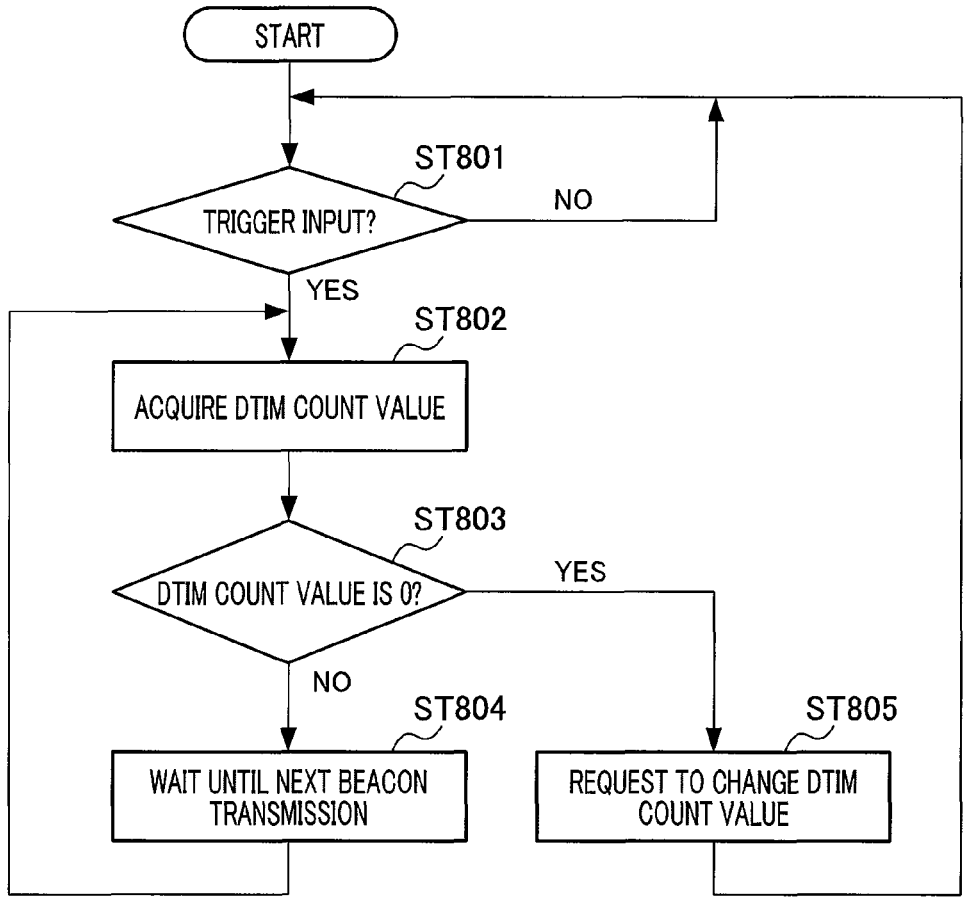
FIG. 8 is a flowchart showing a method of correcting a beacon transmission period according to Embodiment 1 of the present invention.
Figure 9:
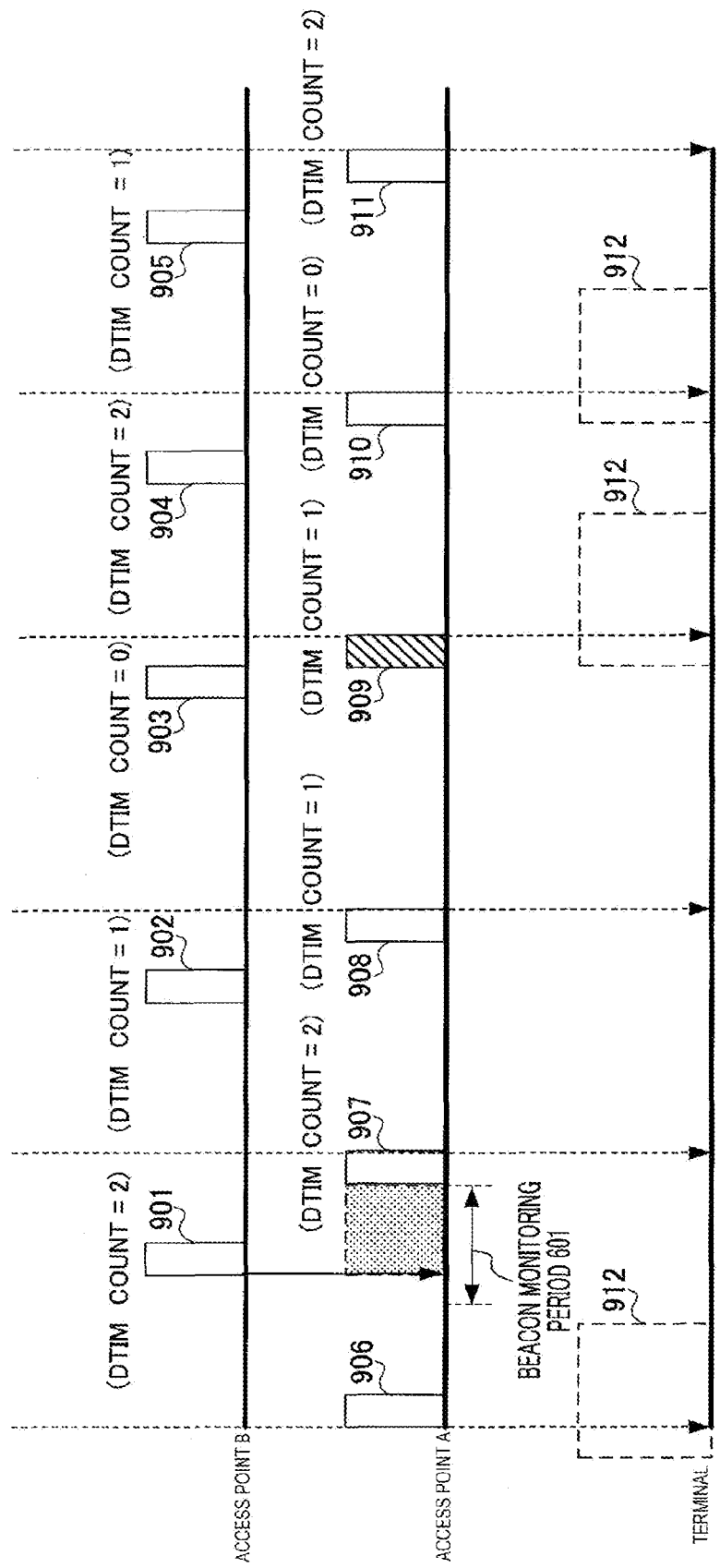
FIG. 9 shows a method of correcting a beacon transmission period according to Embodiment 1 of the present invention.

Next, details of the method of correcting a DTIM period by beacon correction section 204 in step ST506 will be explained using FIG. 8 and FIG. 9. FIG. 8 and FIG. 9 are flowcharts showing the method of correcting a DTIM period.

Beacon correction section 204 is waiting for a trigger from beacon analysis section 203 (step ST801), and acquires, when the trigger is inputted, a DTIM count value of the next beacon to be transmitted from wireless LAN control section 202 (step ST802).

Next, beacon correction section 204 decides whether or not the DTIM count value acquired from wireless LAN control section 202 is "0" (step ST803). When the DTIM count value of the beacon is not "0," beacon correction section 204 waits for transmission of the next beacon (step ST804) and returns to step ST802. On the other hand, when the DTIM count value of the beacon is "0," beacon correction section 204 requests wireless LAN control section 202 to correct the DTIM count value of the next beacon from "0" to "1" (step ST805) and returns to the step of waiting for a trigger from beacon analysis section 203 again (step ST801).

Next, the method of correcting a DTIM period will be explained in further detail using FIG. 9. Beacons are transmitted from each access point at regular intervals. Furthermore, when a beacon is transmitted, the DTIM count value is decremented by "1" every time a beacon is transmitted. The value subtracting "1" from the DTIM period is in the beacon next to the DTIM beacon in which the DTIM count value is "0," that is, the beacon next to the DTIM beacon.

For example, when the DTIM period is "3," the DTIM count value changes from "2," "1," "0," "2," "1," "0,". . . in order, every time beacon 901 to 905 is transmitted. With beacon 909 to be transmitted next to beacon 908 having the first DTIM count value "1" after a startup, beacon correction section 204 transmits beacon 909 having a DTIM count value "1" again. Upon receiving beacons 908 and 909 having a DTIM count value "1," the terminal recognizes that the next beacon to be received is a DTIM beacon and sets awake state 912 at the next beacon receiving timing, too. Immediately after transmitting DTIM beacon 910 of DTIM count value "0," access point A transmits a broadcast/multicast frame to the terminal. The above-described operations cause the transmission timing of DTIM beacon 903 by access point B to differ from the transmission timing of DTIM beacon 910 by access point A, and can thereby prevent interference with mutual communication between access point A and access point B during transmission of a broadcast/multicast frame. By the way, beacon analysis section 203 is effective only when the DTIM period is "2" or more.

As described so far, the present embodiment determines whether or not the beacon period and the DTIM period synchronize with each other between access points, corrects the DTIM period in the case of synchronization, and can thereby prevent, even among access points using the same channel, a delay and jitter of only terminals under the control of a certain specific access point from increasing, eliminate the possibility of mutual interference during a broadcast/multicast service and receive an impartial broadcast/multicast service.

Embodiment 1 sets a beacon monitoring period immediately before transmission of a beacon of wireless LAN communication apparatus 200, but the present invention is not limited to this, and the beacon monitoring period may be set immediately after transmission of a beacon of wireless LAN communication apparatus 200 or the beacon monitoring period may also be set both immediately before and immediately after transmission of a beacon of wireless LAN communication apparatus 200. When the beacon monitoring period is set immediately after transmission of a beacon of wireless LAN communication apparatus 200, in step ST505, the DTIM count value of the received beacon is compared with the DTIM count value of the last beacon transmitted by wireless LAN communication apparatus 200 instead of comparing the DTIM count value of the received beacon with the DTIM count value of the next beacon to be transmitted by wireless LAN communication apparatus 200. Furthermore, in Embodiment 1, it is decided in step ST503 whether or not the beacon periods are the same, but the present invention is not limited to this and the system may be adapted so as to decide in step ST503 whether or not the beacon period of wireless LAN communication apparatus 200 is an integer multiple of the beacon period of another access point and move to step ST504 when the beacon period of wireless LAN communication apparatus 200 is an integer multiple of the beacon period of another access point. Furthermore, in Embodiment 1, it is decided in step ST504 whether or not the DTIM periods are the same, but the present invention is not limited to this and the system may also be adapted so as to decide in step ST504 whether or not the DTIM period of wireless LAN communication apparatus 200 is an integer multiple of a DTIM period of another access point and move to step ST505 when the DTIM period of wireless LAN communication apparatus 200 is an integer multiple of the DTIM period of another access point.

Furthermore, in Embodiment 1, the DTIM period is corrected by transmitting beacons of DTIM count value "1" consecutively, but the present invention is not limited to this, and the DTIM period may be corrected by transmitting a beacon of an arbitrary DTIM count value other than "0" next to the beacon having a DTIM count value of "1." That is, the DTIM period can be corrected by transmitting an extra beacon having a DTIM count value different from a normal DTIM count value.

Embodiment 2

Embodiment 2 measures the number of times beacons are received and corrects, when the measured number of times is equal to or greater than a predetermined value, only a DTIM period without correcting any beacon period.

Figure 10:
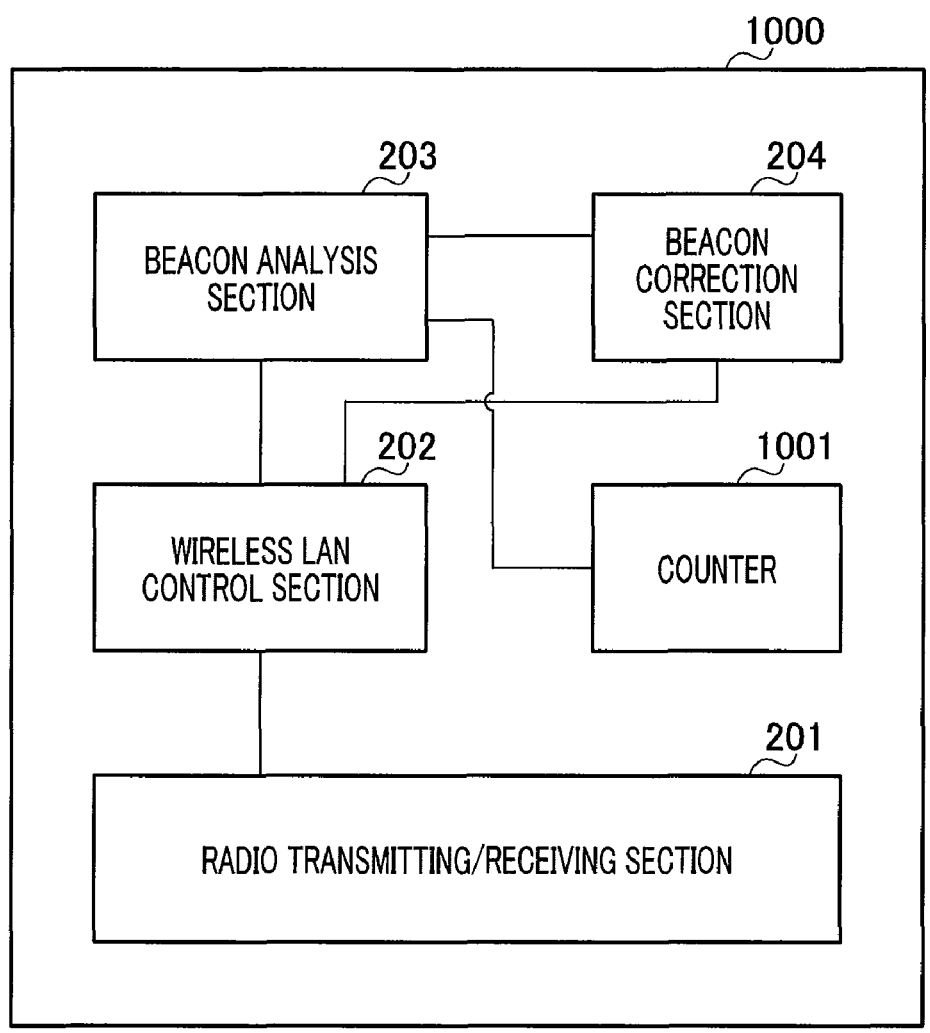
FIG. 10 is a block diagram showing a configuration of a wireless LAN communication apparatus according to Embodiment 2 of the present invention.

FIG. 10 is a block diagram showing a configuration of wireless LAN communication apparatus 1000 according to Embodiment 2 of the present invention.

Wireless LAN communication apparatus 1000 according to present Embodiment 2 corresponds to wireless LAN communication apparatus 200 according to Embodiment 1 shown in FIG. 4 with counter 1001 added as shown in FIG. 10. In FIG. 10, parts having the same configurations as those in FIG. 4 will be assigned the same reference numerals and explanations thereof will be omitted.

Beacon analysis section 203 analyzes a beacon transmitted by another station using a detection result received as input from wireless LAN control section 202. That is, beacon analysis section 203 decides whether the beacon is a beacon received by radio transmitting/receiving section 201 within a predetermined time before transmission of the beacon for wireless LAN communication apparatus 1000 or a beacon received by radio transmitting/receiving section 201 within a predetermined time after transmission of the beacon for wireless LAN communication apparatus 1000. Beacon analysis section 203 then counts up counter 1001 according to the decision result. Furthermore, when the count value on counter 1001 is equal to or greater than a threshold, beacon analysis section 203 commands beacon correction section 204 to correct the DTIM period of wireless LAN communication apparatus 1000 based on the beacon period information and DTIM period information included in the beacon detected by wireless LAN control section 202. To be more specific, when the beacon period of another station in the beacon period information matches with the beacon period of wireless LAN communication apparatus 1000 and the DTIM period of another station in the DTIM period information matches with the DTIM period of wireless LAN communication apparatus 1000, beacon analysis section 203 commands to correct the DTIM period of wireless LAN communication apparatus 1000 such that the DTIM period of another station does not match with the DTIM period of wireless LAN communication apparatus 1000.

Counter 1001, which is a measuring means, measures the number of times beacons are detected according to the decision result of beacon analysis section 203.

Figure 11:
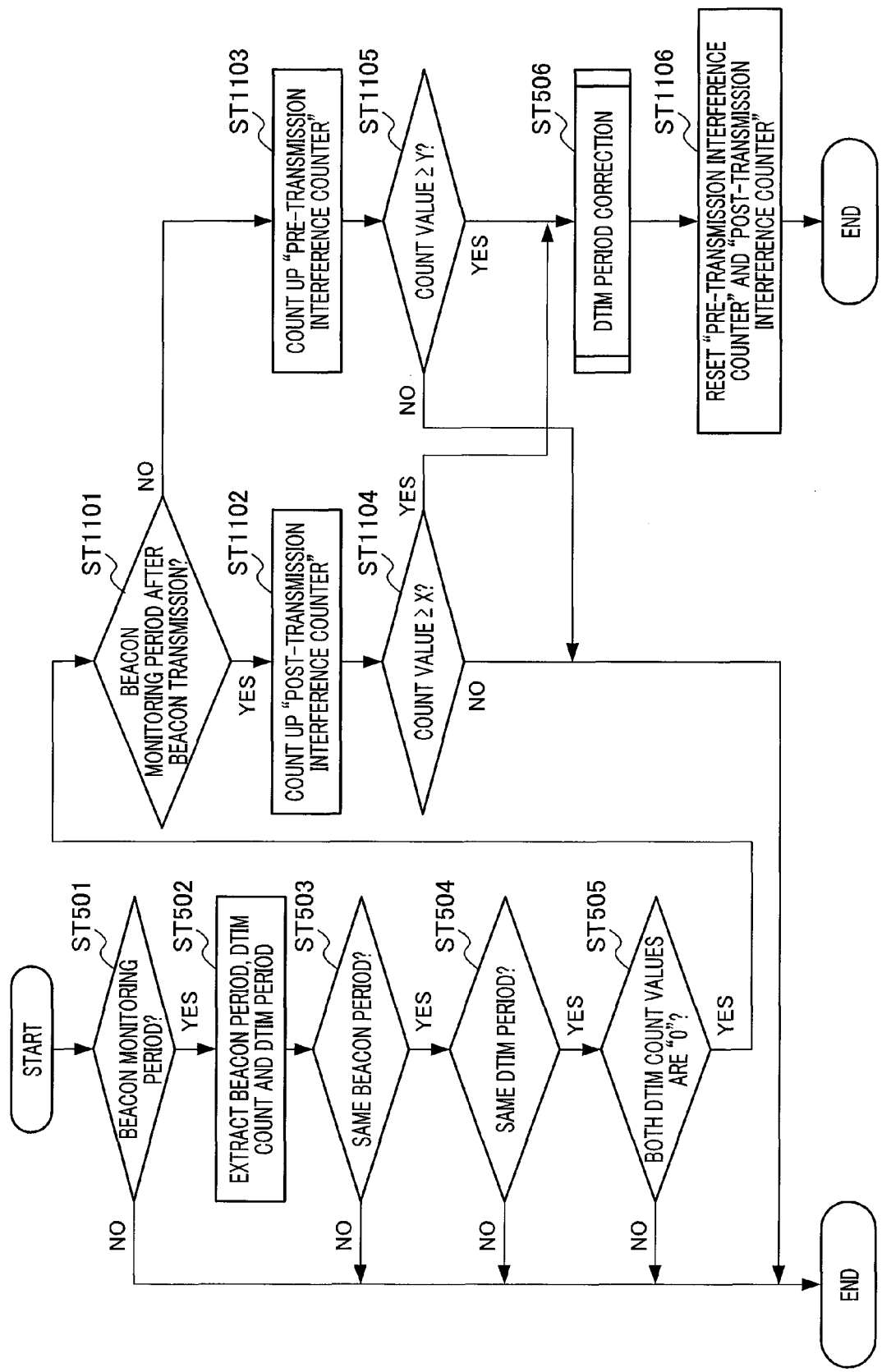
FIG. 11 is a flowchart showing operations of the wireless LAN communication apparatus according to Embodiment 2 of the present invention.

Next, operations of wireless LAN communication apparatus 1000 will be explained using FIG. 11. FIG. 11 is a flowchart showing operations of wireless LAN communication apparatus 1000. In FIG. 11, suppose wireless LAN communication apparatus 1000 is the local station and is access point A and wireless LAN communication apparatus 1000 is another station and is access point B. In FIG. 11, parts having the same configurations as those in FIG. 5 will be assigned the same reference numerals and explanations thereof will be omitted.

Beacon analysis section 203 of access point A decides whether or not both the acquired DTIM count value of access point B and the next DTIM count value to be transmitted by access point A are "0" (step ST505). When both DTIM count values are "0," beacon analysis section 203 moves to step ST1101 or terminates the processing when both DTIM count values are not "0."

Next, beacon analysis section 203 of access point A decides whether or not a beacon detected by wireless LAN control section 202 is within a beacon monitoring period after transmission of the beacon of wireless LAN communication apparatus 1000 (step ST1101). Here, the beacon monitoring period in present Embodiment 2 is the periods immediately before and immediately after access point A transmits a beacon.

Figure 12:
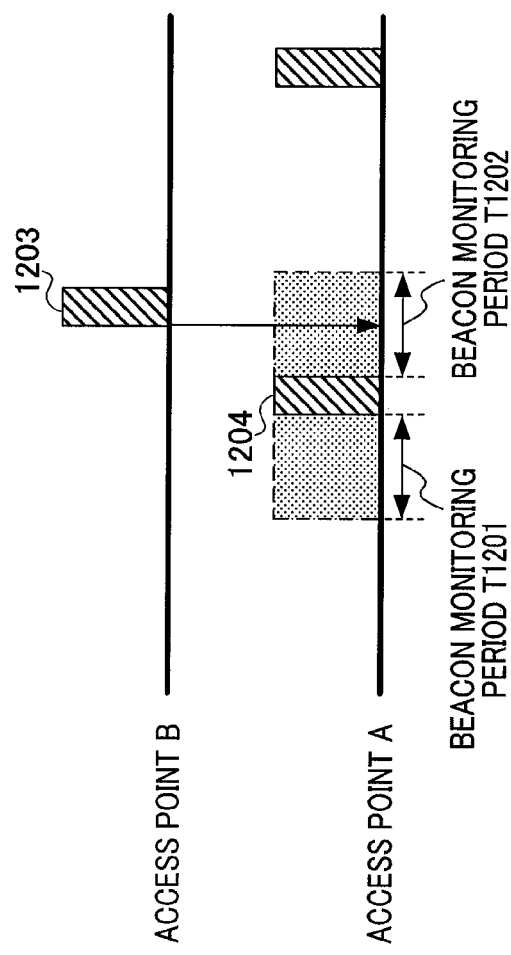
FIG. 12 shows beacon reception timing according to Embodiment 2 of the present invention.

FIG. 12 shows an example where beacon monitoring period T1201 (i.e. pre-transmission monitoring time) of access point A is provided immediately before transmission of beacon 1204 of access point A, and beacon monitoring period T1202 (i.e. post-transmission monitoring time) of access point A is provided immediately after transmission of beacon 1204 of access point A. That is, the fact that beacon 1203 received by access point A is in beacon monitoring period T1201 or beacon monitoring period T1202 means that there is a possibility that the transmission timing of beacon 1204 of access point A overlaps the transmission timing of beacon 1203 of access point B. The period of beacon monitoring period T1201 and beacon monitoring period T1202 can be set to an arbitrary length.

Furthermore, counter 1001 includes a pre-transmission interference counter that counts when a beacon is detected within beacon monitoring period T1201 and a post-transmission interference counter that counts when a beacon is detected within beacon monitoring period T1202.

Referring back to FIG. 11, the post-transmission interference counter of counter 1001 is counted up when a beacon is detected within beacon monitoring period T1202 (step ST1102) and the pre-transmission interference counter of counter 1001 is counted up when a beacon is detected within beacon monitoring period T1201 (step ST1103).

Next, beacon analysis section 203 of access point A decides whether or not the count value on the post-transmission interference counter of counter 1001 is equal to or greater than a threshold X (X is an integer equal to or greater than "1") (step ST1104).

When the count value on the post-transmission interference counter of counter 1001 is not equal to or greater than the threshold X, the processing is terminated, and, when the count value on the post-transmission interference counter of counter 1001 is equal to or greater than the threshold X, the beacon period of wireless LAN communication apparatus 1000 is corrected (step ST506).

Furthermore, beacon analysis section 203 of access point A decides whether or not the count value on the pre-transmission interference counter of counter 1001 is equal to or greater than a threshold Y (Y is an integer equal to or greater than "1") (step ST1105).

When the count value on the pre-transmission interference counter of counter 1001 is not equal to or greater than the threshold Y, the processing is terminated and when the count value on the pre-transmission interference counter of counter 1001 is equal to or greater than the threshold Y, the beacon period of wireless LAN communication apparatus 1000 is corrected (step ST506).

Next, beacon correction section 204 of access point A corrects the DTIM period (step ST506) and access point A transmits the beacon so as to correspond to the corrected DTIM period.

Next, beacon analysis section 203 of access point A resets the pre-transmission interference counter and post-transmission interference counter of counter 1001, and sets the counter value to "0" (step ST1106). Even if the transmission period of the beacon is not corrected, when a certain time has passed, counter 1001 may be designed so as to set the count value on the pre-transmission interference counter and the count value on the post-transmission interference counter to "0."

Furthermore, the thresholds of the pre-transmission interference counter and the post-transmission interference counter of counter 1001 have different values between X and Y. When the thresholds of the pre-transmission interference counter and the post-transmission interference counter of counter 1001 are "1," the DTIM period is corrected by detection of one beacon. When access point A detects the beacon of access point B in beacon monitoring period T1202, the DTIM period is corrected when access point B detects access point A in beacon monitoring period T1201 X times. Furthermore, when access point A simultaneously detects access point A in beacon monitoring period T1201 Y times, the same DTIM period is corrected. In this case, when X and Y have the same value, beacons having the same DTIM count value are transmitted at the same timing even after correction. Therefore, by setting X and Y to different values, the access point having the value X or Y, whichever is smaller, can correct the DTIM period first and prevent mutual interference between access point A and access point B. Furthermore, when access point B is an access point without performing the mounting of present Embodiment 2, access point A corrects the beacon transmission period not only upon detecting a beacon in beacon monitoring period T1201 but also upon detecting a beacon in beacon monitoring period T1202. As a result, it is possible to prevent mutual interference between access point A and access point B.

As shown above, in addition to the effect of Embodiment 1 above, present Embodiment 2 corrects the DTIM period when the number of times beacons are detected reaches a predetermined number of times, and therefore by causing the number of times beacons are detected to start correction of the DTIM period to vary from one access point to another, it is possible to prevent the access points from performing the same correction causing timings of transmitting DTIM beacons again to synchronize with each other. That is, present Embodiment 2 can autonomously correct DTIM periods irrespective of whether or not other access points are mounted with the configuration of present Embodiment 2. As a result, interference between multicast/broadcast services can be avoided in any environment and it is possible to improve service quality such as bands and delays.

Embodiment 2 sets a beacon monitoring period immediately after transmission of a beacon of the own station, but the present invention is not limited to this and the beacon monitoring period may be set immediately before transmission of the beacon of the own station or the beacon monitoring period may be set both immediately before and immediately after transmission of the beacon of the own station. When the beacon monitoring period is set immediately before transmission of the beacon of the own station, in step ST505, the DTIM count value of the received beacon is compared with the DTIM count value of the next beacon to be transmitted by the own station instead of comparing the DTIM count value of the received beacon with the count value of the last transmitted beacon. Furthermore, in step ST503, present Embodiment 2 decides whether or not the beacon periods are the same, but the present invention is not limited to this, and in step ST503, the system may also be adapted so as to decide whether or not the beacon period of the own station is an integer multiple of the beacon period of another access point, and move to step ST504 when the beacon period of the own station is an integer multiple of the beacon period of another access point. Furthermore, in step ST504, present Embodiment 2 decides whether or not the DTIM periods are the same, but the present invention is not limited to this, and in step ST504, the system may also be adapted so as to decide whether or not the DTIM period of the own station is an integer multiple of the DTIM period of another access point and move to step ST505 when the DTIM period of the own station is an integer multiple of the DTIM period of another access point.

Furthermore, present Embodiment 2 corrects the DTIM period by consecutively transmitting beacons of DTIM count value "1," but the present invention is not limited to this and the DTIM period may also be corrected by transmitting beacons of an arbitrary DTIM count value other than "0" next to the beacon whose DTIM count value is "1." That is, the DTIM period can be corrected by transmitting an extra beacon having a DTIM count value different from a normal DTIM count value. Furthermore, present Embodiment 2 assumes that the threshold X to be compared with the count measured using the post-transmission interference counter has a value different from the threshold Y to be compared with the count measured using the pre-transmission interference counter, but the present invention is not limited to this, and the threshold to be compared with the count measured using the post-transmission interference counter may have the same value as the threshold to be compared with the count measured using the pre-transmission interference counter.

Embodiment 3

Instead of correcting only the DTIM period without correcting the beacon period as in the case of Embodiment 1 and Embodiment 2 above, present Embodiment 3 shifts beacon transmission timing of the local station according to a predetermined rule regardless of the beacon period, and thereby corrects both the beacon period and DTIM period. When all beacons are DTIM beacons, that is, when the DTIM periods of all beacons are "1," the DTIM count value is always "0", and therefore the technique of shifting the beacon period of the DTIM beacon cannot be used, and so a new approach is necessary.

Figure 13:
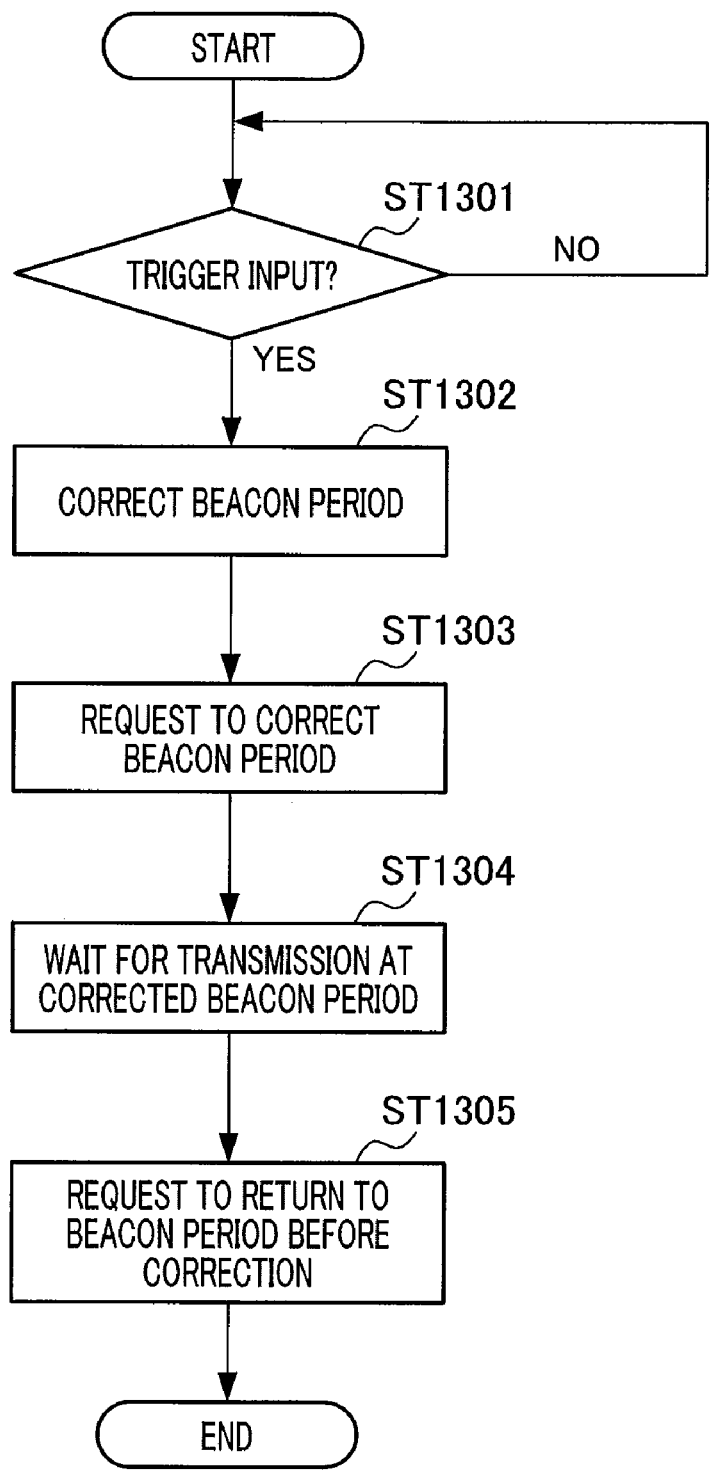
FIG. 13 is a flowchart showing a method of correcting a beacon transmission period according to Embodiment 3 of the present invention.

FIG. 13 is a flowchart showing a method of correcting a DTIM period according to Embodiment 3 of the present invention. In present Embodiment 3, all beacons transmitted by each wireless LAN communication apparatus are DTIM beacons. In present Embodiment 3, the configuration of the wireless LAN communication apparatus is the same as the configuration of FIG. 4 and operations of the wireless LAN communication apparatus are the same as those in FIG. 5, and therefore explanations thereof will be omitted.

Beacon correction section 204 is waiting for a trigger from beacon analysis section 203 (step ST1301) and corrects the beacon period of the next beacon to be transmitted when the trigger is inputted (step ST1302). In this case, beacon correction section 204 corrects the beacon period using equation 1.

$$X = A + A/(B+1) \tag{Equation 1}$$

where: X is a beacon period after the correction;
A is the current beacon period before the correction; and
B is the number of access points detected.

Next, beacon correction section 204 requests wireless LAN control section 202 to transmit the next and subsequent beacons to be transmitted at corrected beacon period X calculated from equation 1 (step ST1303), and waits for the beacons to be transmitted at corrected beacon period X (step ST1304).

Figure 14:
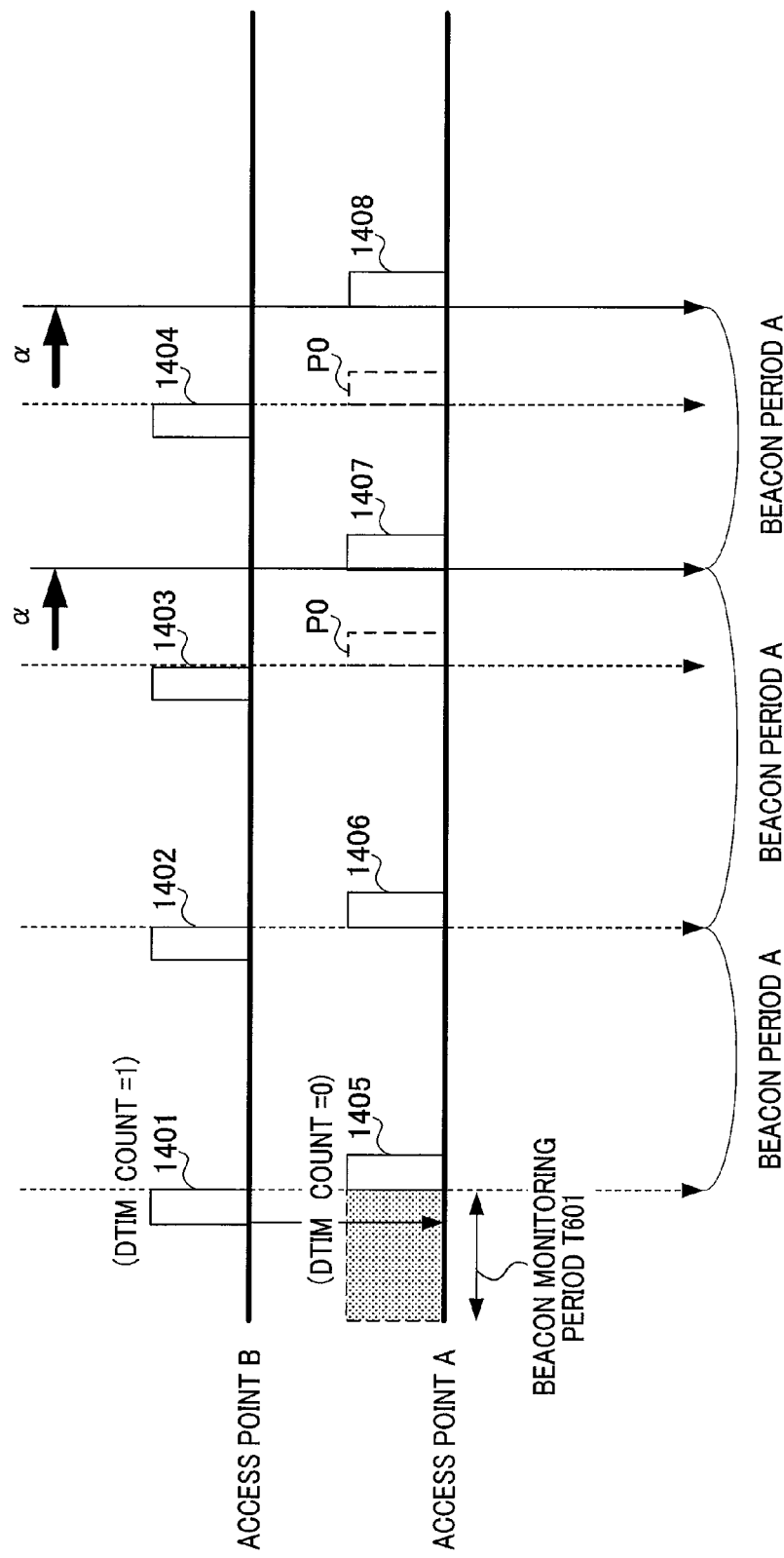
FIG. 14 shows the method of correcting a beacon transmission period according to Embodiment 3 of the present invention.

Next, the method of correcting a DTIM period will be explained in further detail using FIG. 14. FIG. 14 shows the method of correcting a DTIM period. In FIG. 14, access point B is transmitting beacons 1401 to 1404 at certain beacon period A. On the other hand, access point A transmits beacons at beacon period A from beacon 1405 up till beacon 1406. Furthermore, in FIG. 14, access point A assumes the beacon to be transmitted at the next timing to be beacon 1406 and assumes the beacon to be transmitted next to beacon 1406 to be beacon 1407.

Beacon correction section 204 starts correcting the beacon period at the timing of transmitting beacon 1406 and corrects beacon period A after transmitting beacon 1406 until beacon 1407 is transmitted to beacon period X using equation 1. In this way, the beacon period between beacon 1406 and beacon 1407 to be transmitted next to beacon 1406 becomes corrected beacon period X, so that it is possible to prevent interference that would be produced by being transmitted at timing of beacon P0 unless the beacon period is corrected.

Next, after beacon 1407 is transmitted, beacon correction section 204 changes the beacon period between beacon 1407 and beacon 1408 from corrected beacon period X back to beacon period A before correction, and requests wireless LAN control section 202 to transmit beacon 1408 at beacon period A (step ST1305). In this way, beacons 1407 and 1408 of access point A after correcting the beacon period are always transmitted with a delay time α from the transmission timing of beacons 1403 and 1404 of access point B, and mutual interference can be thereby prevented.

Embodiment 3 corrects X according to the number of access points detected as shown in equation 1, but the present invention is not limited to this, and it is possible to prevent interference with other access points by setting the beacon period of access point A to an arbitrary length greater than the beacon period before the correction. Furthermore, when only one access point is detected or when there is no likelihood that a plurality of access points interfere with each other simultaneously, the corrected beacon period may be preferably set to half the period of the beacon period before the correction. For example, when the beacon period before the correction is 100 milliseconds, the corrected beacon period is set to 150 milliseconds by shifting the corrected beacon period from the beacon period before the correction by 50 milliseconds.

Furthermore, as another method of correcting the beacon period, when there is one more access point of the same channel other than the local station, the corrected beacon period is shifted by half the beacon period before the correction. For example, when the beacon period before the correction of access point A is 100 milliseconds, beacon correction section 204 of access point A transmits the next beacon after 50 milliseconds pass from the timing the beacon of access point B is received.

Furthermore, as another method of beacon period correction, when there are a plurality of access points the same channel and the same beacon period apart from the local station, access point A sets a beacon period having the value given by dividing the beacon period of the local station before the correction by the number of access points including the local station. For example, when the beacon period before the correction is 100 milliseconds, if there are two other access points having the same beacon period on the same channel, the next beacon is transmitted at a beacon period shifted by 100 milliseconds/3 (the total number of access points including the own station is 3), that is, 33 milliseconds.

In addition to the above-described effect of Embodiment 1, present Embodiment 3 can reduce interference between broadcast/multicast frames even when DTIM beacons are transmitted by all beacons. Furthermore, present Embodiment 3 calculates an optimal beacon period using the number of other access points that are detected, and can thereby separate beacon transmission timings by access points as far as possible from each other and prevent deterioration of service quality of a broadcast/multicast service in an environment in which a plurality of access points coexist on the same channel.

Embodiment 3 sets a beacon monitoring period immediately before transmission of the beacon of the local station, but the present invention is not limited to this and the beacon monitoring period may also be set immediately after transmission of the beacon of the local station or the beacon monitoring period may be provided both immediately before and immediately after the beacon of the local station is transmitted.

INDUSTRIAL APPLICABILITY

The wireless LAN communication apparatus and beacon transmission method according to the present invention are especially suitable for use in delivering a broadcast/multicast service, through a plurality of access points, to terminals under the control of the respective access points.

The invention claimed is:

1. An access point apparatus of an infrastructure mode network comprising:
   a receiving section configured to receive a beacon of another access point apparatus, the beacon including beacon period information of the another access point apparatus, delivery traffic indication message ("DTIM") period information of the another access point apparatus, and DTIM count information of the another access point apparatus, wherein the beacon is a DTIM beacon when the DTIM count information is zero and is a non-DTIM beacon when the DTIM count information is non-zero;
   a beacon detection section configured to detect the beacon received in the receiving section in a predetermined time immediately before or after a beacon of the access point apparatus is transmitted;
   a beacon adjustment section configured to, when a DTIM beacon of the access point apparatus is determined to collide with a DTIM beacon of the another access point apparatus, adjust a transmission period of DTIM beacons of the access point apparatus by changing a DTIM count of the next beacon based on the beacon period information, the DTIM period information, and the DTIM count information included in the detected beacon; and
   a transmitting section configured to transmit the DTIM beacons at the adjusted transmission period.

2. The access point apparatus according to claim 1, wherein, the DTIM beacon of the access point apparatus is determined to collide with the DTIM beacon of the another access point apparatus when
   periods of DTIM period information of the another access point apparatus and the access point apparatus match,
   periods of beacon period information of the another access point apparatus and the access point apparatus match, and
   counts of DTIM count information of the another access point apparatus and the access point apparatus are zero,
   wherein the beacon adjustment section is configured to, when the DTIM beacon of the access point apparatus is determined to collide with the DTIM beacon of the another access point apparatus, adjust the transmission period of the DTIM beacons of the access point apparatus such that the transmission period of DTIM beacons of the another access point apparatus and the transmission period of the DTIM beacons of the access point apparatus do not match.

3. The access point apparatus according to claim 1, wherein the beacon adjustment section is configured to, when the DTIM beacon of the access point apparatus is determined to collide with the DTIM beacon of the another access point apparatus and
when a next beacon to be transmitted by the transmitting section is a DTIM beacon, control the transmitting section to transmit at least one extra beacon other than the DTIM beacon before transmitting the DTIM beacon to thereby adjust the transmission period of the DTIM beacons of the access point apparatus.

4. The access point apparatus according to claim 1, further comprising:
a measuring section configured to measure the number of times beacons of the another access point apparatus are detected in the beacon detection section to be DTIM beacons,
wherein the beacon adjustment section is further configured to refrain from adjusting the transmission period of the DTIM beacons of the access point apparatus until the number of times measured by the measuring section is equal to or greater than a threshold, after which the transmission period of the DTIM beacons of the access point apparatus is adjusted.

5. The access point apparatus according to claim 4, wherein:
the beacon detection section is further configured to detect beacons received in the receiving section both in a pre-transmission monitoring time which is a predetermined time immediately before a beacon of the access point apparatus is transmitted and in a post-transmission monitoring time which is a predetermined time immediately after the beacon of the access point apparatus is transmitted;
the measuring section is further configured to measure the number of times DTIM beacons are detected in the beacon detection section separately between when a DTIM beacon received in the receiving section is detected in the pre-transmission monitoring time and when a DTIM beacon received in the receiving section is detected in the post-transmission monitoring time; and
when one of the number of times DTIM beacons are detected in the pre-transmission monitoring time and the number of times DTIM beacons are detected in the post-transmission monitoring time is equal to or greater than the threshold, the beacon adjustment section is further configured to adjust the transmission period of the DTIM beacons of the access point apparatus.

6. The access point apparatus according to claim 5, wherein:
the beacon adjustment section is further configured to set a first threshold to be compared with the measured number of times DTIM beacons are detected in the pre-transmission monitoring time and a second threshold to be compared with the measured number of times DTIM beacons are detected in the post-transmission monitoring time to different values.

7. A beacon transmission method comprising the steps of:
receiving a beacon including beacon period information comprising information about a beacon transmission period of another access point apparatus, delivery traffic indication message ("DTIM") beacon period information of the another access point apparatus, and DTIM count information of the another access point apparatus, wherein the beacon is a DTIM beacon when the DTIM count information is zero and is a non-DTIM beacon when the DTIM count information is non-zero;
detecting a beacon received in a predetermined time immediately before or after an own beacon is transmitted;
when a DTIM beacon of the access point apparatus is determined to collide with a DTIM beacon of the another access point apparatus, adjusting a transmission period of an own DTIM beacon based on the beacon period information and the DTIM period information included in the detected beacon; and
transmitting the own DTIM beacon at the adjusted transmission period.

8. The access point apparatus according to claim 1, wherein the beacon adjustment section is further configured to adjust the transmission period of the DTIM beacons of the access point apparatus after each detection of a beacon of the another access point apparatus is detected to be a DTIM beacon.

9. The access point apparatus according to claim 1, wherein the DTIM count of the next beacon is changed by incrementing the DTIM count of the next beacon.

* * * * *